(12) United States Patent
Jeong et al.

(10) Patent No.: US 12,267,556 B2
(45) Date of Patent: Apr. 1, 2025

(54) DEVICE FOR DETECTING MUSIC DATA FROM VIDEO CONTENTS, AND METHOD FOR CONTROLLING SAME

(71) Applicant: Cochl Inc, Dover, DE (US)

(72) Inventors: Ilyoung Jeong, Seoul (KR); Hyungui Lim, Seoul (KR); Yoonchang Han, Seoul (KR); Subin Lee, Seoul (KR); Jeongsoo Park, Yongin-si (KR); Donmoon Lee, Suwon-si (KR)

(73) Assignee: Cochl Inc, Dover, DE (US)

( * ) Notice: Subject to any disclaimer, the term of this patent is extended or adjusted under 35 U.S.C. 154(b) by 103 days.

(21) Appl. No.: 17/925,682

(22) PCT Filed: May 18, 2021

(86) PCT No.: PCT/KR2021/006244
§ 371 (c)(1),
(2) Date: Nov. 16, 2022

(87) PCT Pub. No.: WO2021/235846
PCT Pub. Date: Nov. 25, 2021

(65) Prior Publication Data
US 2023/0217074 A1 Jul. 6, 2023

(30) Foreign Application Priority Data
May 19, 2020 (KR) .......................... 10-2020-0059429

(51) Int. Cl.
*H04N 21/462* (2011.01)
*G10L 15/06* (2013.01)
*G10L 21/028* (2013.01)
*G10L 25/57* (2013.01)
*G10L 25/81* (2013.01)
*H04N 21/439* (2011.01)
*H04N 21/4627* (2011.01)

(52) U.S. Cl.
CPC ....... *H04N 21/4627* (2013.01); *G10L 15/063* (2013.01); *G10L 21/028* (2013.01); *G10L 25/57* (2013.01); *G10L 25/81* (2013.01); *H04N 21/439* (2013.01)

(58) Field of Classification Search
CPC H04N 21/4627; H04N 21/439; G10L 15/063; G10L 21/028; G10L 25/57; G10L 25/81
See application file for complete search history.

(56) References Cited

U.S. PATENT DOCUMENTS

| | | | |
|---|---|---|---|
| 10,440,431 B1 * | 10/2019 | Bulusu | H04N 21/4532 |
| 2011/0075851 A1 | 3/2011 | LeBoeuf et al. | |
| 2013/0338806 A1 * | 12/2013 | LaRosa | G10H 1/0008 |
| | | | 700/94 |

FOREIGN PATENT DOCUMENTS

| | | | |
|---|---|---|---|
| CN | 1633690 A | 6/2005 | |
| EP | 3640943 A1 | 4/2020 | |
| JP | 2002062892 A | 2/2002 | |
| JP | 2002304185 A | 10/2002 | |

(Continued)

*Primary Examiner* — Mishawn N. Hunter
(74) *Attorney, Agent, or Firm* — NKL Law; Jae Youn Kim

(57) ABSTRACT

A data processing method according to the present invention comprises the steps of: receiving an input of video contents including a video stream and an audio stream; detecting music data from the audio stream; and filtering the audio stream so that the music data detected from the audio stream is removed.

3 Claims, 4 Drawing Sheets

(56) References Cited

FOREIGN PATENT DOCUMENTS

| | | |
|---|---|---|
| JP | 2005-071090 A | 3/2005 |
| JP | 2005518560 A | 6/2005 |
| JP | 2011085824 A | 4/2011 |
| JP | 5051237 B2 | 10/2012 |
| KR | 10-2003-0069419 A | 8/2003 |
| KR | 10-2010-0124983 A | 11/2010 |
| KR | 10-2019-0109661 A | 9/2019 |
| WO | 2009050877 A1 | 4/2009 |

* cited by examiner

DEVICE FOR DETECTING MUSIC DATA FROM VIDEO CONTENTS, AND METHOD FOR CONTROLLING SAME

TECHNICAL FIELD

The present invention relates to a method of processing audio data in which music and voice are mixed.

BACKGROUND ART

Sound source separation technology is for dividing an audio stream including various sounds into a plurality of pieces of audio data according to a specific criterion. For example, sound source separation technology may be used to extract only the voice of a singer from stereo music or to separate two or more audio signals recorded through one microphone from each other. Also, sound source separation technology may be used for noise cancellation of a vehicle, a cellular phone, etc.

Lately, methods of introducing artificial intelligence (AI) in sound source separation technology have been proposed. There is a representative method of separating voice using previously learned voice and noise patterns or statistical data information. According to such a method, it may be possible to separate voice even in a drastically changing noise environment.

Meanwhile, as the video content market grows, problems are arising in relation to copyrights of data included in video content. In particular, when music that is not allowed by the copyright holder is included in video content, distribution of the video content is restricted. Accordingly, there is an increasing demand for separating copyrighted data from video content.

In other words, an operation of determining whether copyrighted data is included in video content, separating or removing the copyrighted data from the original video content, or changing the copyrighted data into license-free data is necessary.

However, according to the conventional video editing process, an editor needs to directly perform such an operation while playing the video, which is inconvenient. Considering the amount of data processed on video platforms lately, it is difficult to inspect a sufficient amount of video content using a conventional method in which a user manually inspects copyrighted data.

DISCLOSURE

Technical Problem

The present invention is directed to providing a data processing device for extracting music data from any audio stream and a method of controlling the same.

The present invention is directed to providing a data processing device for determining whether there is music data in any audio stream which does not additionally include a label, a tag representing a classification of audio data, or log information, using an artificial intelligence (AI) model and a method of controlling the same.

The present invention is directed to providing a data processing device for detecting music data from an original file of video content including an audio stream and a video stream and removing the detected music data from the original file and a method of controlling the same.

The present invention is directed to providing a data processing device for detecting whether there is music data in an audio stream and a time period in which the music data exists using an AI model and a method of controlling the same.

The present invention is directed to providing a data processing device for determining whether music data corresponding to a copyrighted work is included in an audio stream and a method of controlling the same.

Technical Solution

One aspect of the present invention provides a data processing method including receiving video content including a video stream and an audio stream, detecting music data from the audio stream, and filtering the audio stream so that the music data detected from the audio stream is removed.

Advantageous Effects

According to the present invention, even when a user does not directly scan video content, music data included in the video content can be detected, and thus it is possible to improve convenience of a user who edits the video content.

Also, since it is possible to detect music data from a huge amount of video content within a short time, the cost of video editing can be dramatically reduced.

Further, according to the present invention, a data processing device deletes music data corresponding to a copyrighted work included in video content or replaces it with substitute music so that convenience of a video content owner or distributor can be improved.

BEST MODE OF THE INVENTION

A data processing method includes:
receiving video content including a video stream and an audio stream;
detecting music data from the audio stream; and
filtering the audio stream to remove the music data.

Modes of the Invention

Hereinafter, embodiments disclosed in the present specification will be described in detail with reference to the accompanying drawings. Technical terms used herein are for the purpose of describing specific embodiments only and are not intended to limit the technical spirit disclosed herein.

Figure 1:
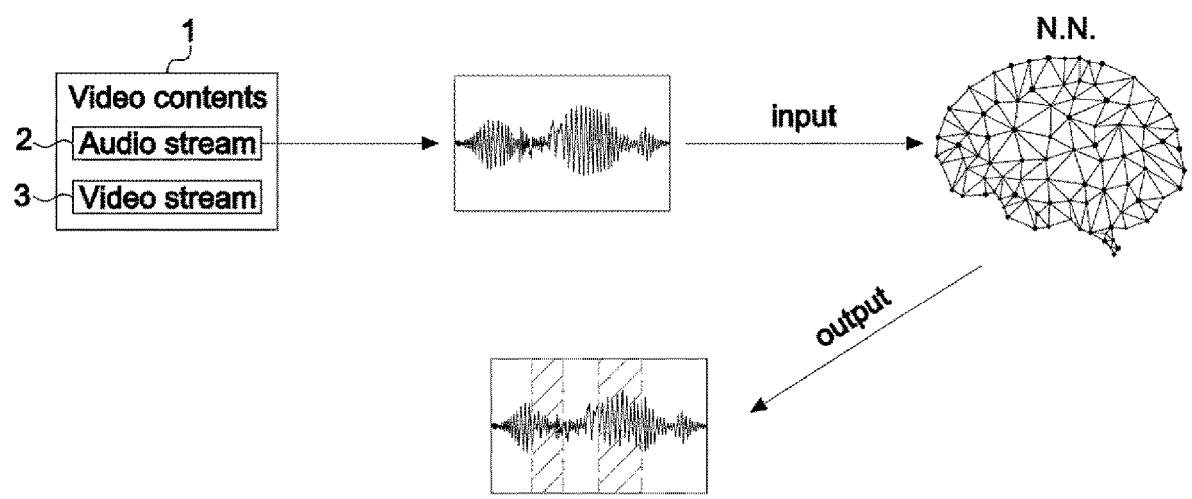
FIG. 1 is a conceptual diagram related to a data processing method according to the present invention.

First, FIG. 1 is a conceptual diagram related to a data processing method according to the present invention. Video content 1 is defined below as a video file including an audio stream 2 and a video stream 3. Also, audio streams may include music data and/or non-music data.

The foregoing term "music" may refer to any type of sound that may be characterized by one or more elements of rhythm (e.g., tempo, meter, and articulation), pitch (e.g., melody and harmony), dynamics (e.g., the volume of sound or notes), etc. and may include sounds of instruments, voices, etc. In addition, as used herein, the term "copyrighted work" may refer to a unique or distinctive musical work or composition and may include such a musical work, creative composition, or reproduction in the form of sound or audio such as a song, a tune, etc. Further, the term "audio stream" may be one or more electrical signals or data sequences representing one or more parts of a sound stream which may include a plurality of pieces of music, surrounding sounds, speech, noise, etc.

Referring to FIG. 1, the data processing device 100 according to the present invention may scan an audio stream included in a video stream and determine whether music data is included in the audio stream.

Specifically, the data processing device 100 may determine whether music data is included in the audio stream using an artificial intelligence (AI) model installed in an external server or the data processing device 100. In this case, the AI model may include an artificial neural network that performs deep learning or machine learning.

Figure 2:
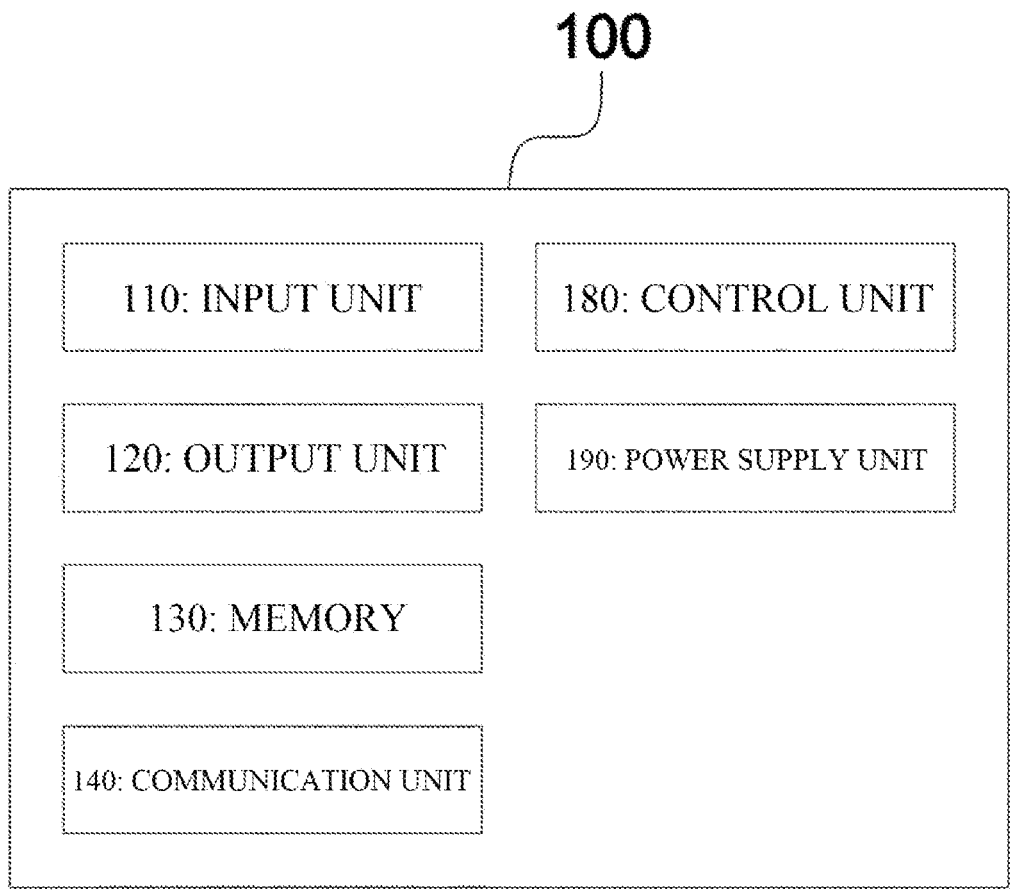
FIG. 2 is a block diagram showing components of a data processing device according to the present invention.

FIG. 2 is a block diagram of a data processing device according to an embodiment of the present invention. Referring to FIG. 2, the data processing device 100 according to the present invention may include an input unit 110, an output unit 120, a memory 130, a communication unit 140, a control unit 180, and a power supply unit 190.

More specifically, the communication unit 140 among the components may include one or more modules that allow wireless communication between the data processing device 100 and a wireless communication system, between the data processing device 100 and another data processing device 100, or between the data processing device 100 and an external server. The communication unit 140 may include one or more modules that connect the data processing device 100 to one or more networks.

The input unit 110 may include a camera or video input unit for inputting a video signal, a microphone or audio input unit for inputting an audio signal, and a user input unit (e.g., a touch key, a push key (mechanical key), etc.) for receiving information from a user. Voice data or image data collected through the input unit 110 may be analyzed and processed as a control command of the user.

The output unit 120 is for generating an output related to vision, hearing, touch, etc. and may include at least one of a display unit, a sound output unit, a haptic module, and a light output unit. The display unit and a touch sensor may be formed into a mutual layer structure or the display unit is integrated with a touch sensor to implement a touchscreen. The touchscreen may function as a user input device that provides an input interface between the data processing device 100 and the user and may also provide an output interface between the data processing device 100 and the user.

The memory 130 stores data that supports various functions of the data processing device 100. The memory 130 may store multiple application programs or applications run on the data processing device 100 and data and instructions for operations of the data processing device 100. At least some of the application programs may be downloaded from an external server through wireless communication. Also, at least some of the application programs may exist in the data processing device 100 for basic functions (e.g., a function of receiving and making calls and a function of receiving and sending messages) of the data processing device 100 from the time of shipment. Meanwhile, the application programs may be stored in the memory 130, installed on the data processing device 100, and run by the control unit 180 to perform operations (or functions) of the electronic device control device.

In addition to operations related to the application programs, the control unit 180 generally controls overall operations of the data processing device 100. The control unit 180 may provide appropriate information to the user or process an appropriate function for the user by processing a signal, data, information, etc. input or output through the above-described components or running the application programs stored in the memory 130.

Also, to run the application programs stored in the memory 130, the control unit 180 may control at least some of the components described with reference to FIG. 2. Further, to run the application programs, the control unit 180 may operate at least two of the components included in the data processing device 100 in combination with each other.

The power supply unit 190 receives external power or internal power under the control of the control unit 180 and supplies power to each of the components included in the data processing device 100. The power supply unit 190 includes a battery, which may be an embedded battery or replaceable battery.

At least some of the components may operate in cooperation with each other to perform operations, control, or a control method of the electronic device control device according to various embodiments described below. Also, the operations, the control, or the control method of the electronic device control device may be implemented on the electronic device control device by running at least one of the application programs stored in the memory 130.

In an example, the data processing device 100 may be implemented in the form of a separate terminal. In other words, the data processing device 100 may be a terminal, such as a desktop computer, a digital television (TV), etc., and may also be implemented in the form of a mobile terminal such as a movable cellular phone, a laptop computer, a personal digital assistant (PDA), a tablet personal computer (PC), a laptop computer, a wearable device, etc.

Figure 3:
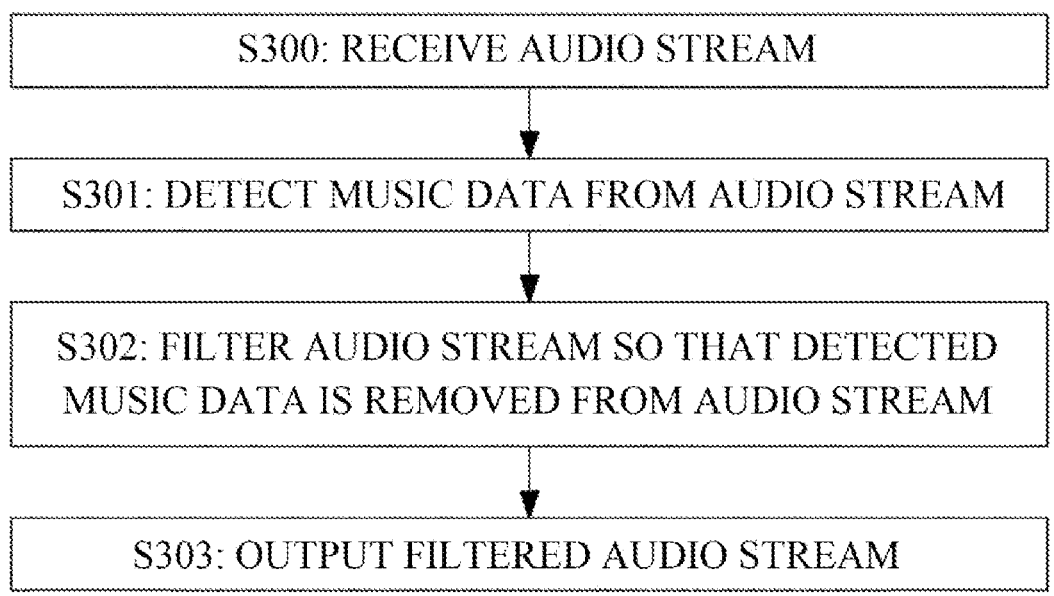
FIG. 3 is a flowchart illustrating a data processing method according to an embodiment of the present invention.
Figure 4:
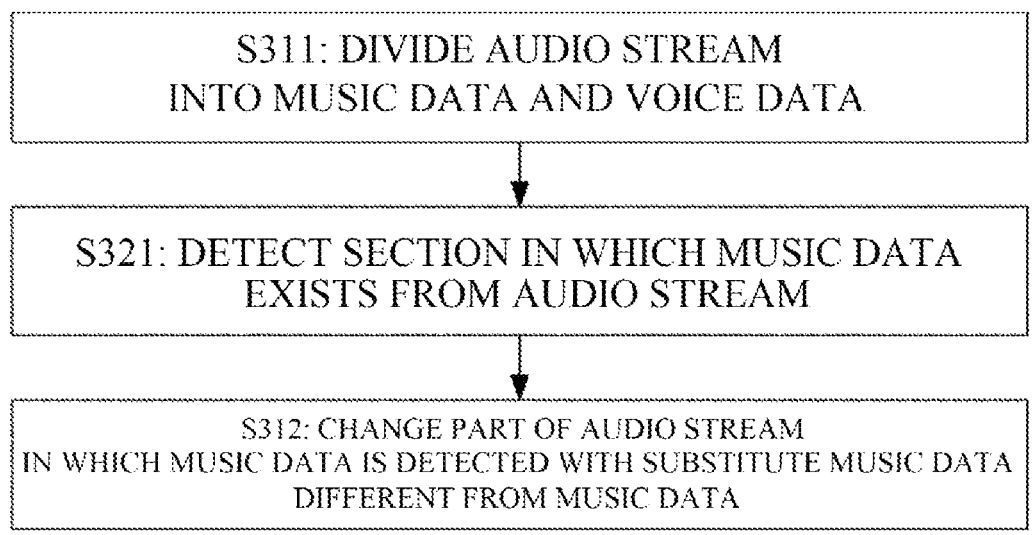
FIG. 4 is a flowchart illustrating a data processing method according to an embodiment of the present invention.

An AI-based music data filtering method proposed by the present invention will be described below with reference to FIGS. 3 and 4.

First, the input unit 110 may receive information related to video content including at least one of an audio stream and a video stream (S300). The input unit 110 may receive information related to the audio stream.

Also, the communication unit 140 may receive the information related to the video content including at least one of the audio stream and the video stream from an external server or an external terminal.

In other words, the video content or the audio stream may be a file directly uploaded by a user or received from an external server.

The control unit 180 may detect music data from the audio stream included in the received video content (S301). As shown in FIG. 4, the step S301 of detecting music data may include an operation S311 of dividing the audio stream into music data and voice data and an operation S321 of detecting a section of the audio stream in which music data exists.

Specifically, the operation S311 of dividing the audio stream into music data and voice data may be performed by an AI model trained in advance. In other words, the control unit 180 may divide the received audio stream into music data and voice data using the AI model.

As an example, the AI model may receive the audio stream and separately output a probability that every preset unit section of the received audio stream corresponds to music data and a probability that every preset section of the received audio stream corresponds to voice data. In other words, the control unit 180 may determine whether audio of the unit sections of the received audio stream corresponds to music data or voice data using an output of the AI model.

In this case, the control unit 180 may variably set the unit sections on the basis of physical characteristics of the audio stream or physical characteristics of the video content. Also, the control unit 180 may variably set the unit sections on the basis of a user input applied to the input unit 110. For example, the user input may be related to at least one of accuracy, performance, and processing speed.

As another example, the AI model may output a variable energy distribution map in accordance with a sequence of the received audio stream. In this case, the energy distribution map may be related to a probability that a part of the audio stream is music and/or a probability that a part of the audio stream is voice.

According to another embodiment, the control unit 180 may divide the received audio stream into music data and non-music data using a first AI model and divide the divided non-music data into voice data and non-voice data using a third AI model.

Here, the non-voice data is audio data that does not correspond to human voice such as knocks or animal cries. Also, the first AI model may be an artificial neural network for detecting whether input audio is music, and the third AI model may be an artificial neural network for determining what kind of surrounding sound input audio is.

The first and third AI models may be integrated as necessary. In this case, the integrated AI model may output probability values corresponding to a plurality of classes or labels including music for audio input.

Subsequently, the control unit 180 may determine whether music is included in a target section while sequentially shifting the target section.

For example, the target section may have a length of one second. Also, the control unit 180 may determine whether music is included in the target section while shifting the target section so that a current section and a previous section overlap.

Compared to the above-described division operation S311, the detection operation S321 has a difference that a section simultaneously including voice and music can be detected. Also, the control unit 180 may perform the detection operation S321 using a second AI model which is different from the first AI model used in performing the division operation S311.

For example, the first AI model used in the division operation S311 may be configured to perform learning using training data labeled as music data and voice data.

Unlike this, the second AI model used in the detection operation S321 may be configured to perform learning using training data labeled as data including music and data not including music. More specifically, the second AI model used in the detection operation S321 may be configured to perform learning using training data labeled as data including music at a ratio of a reference value or more, data including music at a ratio of the reference value or less, and data not including any music.

As described above, the control unit 180 may detect music data from the audio stream using at least one of a result of the division operation S311 and a result of the detection operation S321. Meanwhile, when accuracy of the division operation S311 is a reference value or more, the control unit 180 may omit the detection operation S321.

According to an embodiment, the control unit 180 may perform the detection operation S321 for only a part of the received audio stream classified as music through the division operation S311.

According to another embodiment, the control unit 180 may determine a target of the detection operation S321 in the received audio stream on the basis of unit section-specific probabilities output through the division operation S311.

According to another embodiment, the control unit 180 may perform the detection operation S321 for all the received audio stream like in the division operation S311.

Meanwhile, the control unit 180 may detect whether each unit section of the audio stream is music data using at least one of the division operation S311 and the detection operation S321 and then detect a part of the audio stream as music data on the basis of section continuance of the detection result.

Also, the control unit 180 may detect a variation aspect of the detected music data and divide one piece of music data into a plurality of pieces of music data on the basis of the detected variation aspect. For example, when different pieces of music are continuously streamed and detected as one piece of music, the control unit 180 may divide the music data into a plurality of pieces of music data by monitoring the variation aspect of the music data.

When the music data is detected as described above (S301), the control unit 180 may filter the audio stream to remove the detected music data from the audio stream (S302).

Specifically, the control unit 180 may delete the part of the audio stream detected as music data.

As another example, the control unit 180 may change the part of the audio stream detected as music data with substitute music data which is different from the music data.

According to an embodiment, the control unit 180 may determine whether the detected music data corresponds to a copyrighted work and perform the filtering step S302 in accordance with the determination result. In other words, even when the detected music data does not correspond to a copyrighted work, the control unit 180 may exclude the music data from targets to be filtered. When a plurality of different pieces of music data are detected from the audio stream, the control unit 180 may determine whether each piece of the music data is a copyrighted work.

To consider whether the music data is a copyrighted work in the filtering step S302, the memory of the data processing device 100 may store a copyrighted work database including information related to copyrighted works. In other words, the control unit 180 may determine whether the detected music data is a copyrighted work using the copyrighted work database stored in advance in the memory. Also, when the detected music data is determined to be a copyrighted work, the control unit 180 may filter the audio stream to remove the music data.

Meanwhile, the control unit 180 may determine the substitute music data in consideration of characteristics of the detected music data. For example, the characteristics may be related to at least one of genre, atmosphere, key, tempo, volume, and sound source length.

According to an embodiment, the control unit 180 may analyze information related to a genre and/or atmosphere of the detected music data using a fourth AI model and select substitute music data on the basis of the analysis results.

In other words, the control unit 180 may detect information related to at least one of the genre and atmosphere of the detected music data using the fourth AI model which is designed to analyze a genre or atmosphere of music. In particular, the fourth AI model may be configured to perform learning using training data labeled with genres or atmospheres of music. Here, information acquired by the fourth AI model may be configured in the form of a feature vector.

Also, the control unit 180 may compare a feature vector of a substitute music candidate group with the feature vector of the detected music data to calculate a similarity between the detected music data and the substitute music candidate group. In addition, the control unit 180 may select any one of pieces of substitute music data on the basis of the calculated similarity and change the detected music data with the selected piece of substitute music data.

According to another embodiment, the control unit 180 may convert the substitute music data on the basis of the volume of the detected music data. Specifically, the control unit 180 may calculate an energy level per unit section which is reset for the detected music data. For example, the control unit 180 may set second unit sections to be shorter than first unit sections which have been used in the division operation S311 and calculate an energy level of the detected music data per second unit section. For example, the second unit sections may be 0.2 seconds.

The control unit 180 may apply a low-pass filter defined by a vector composed of the calculated energy level to the substitute music data and change the existing music data with the application result.

Meanwhile, the control unit 180 may analyze a part of the video stream corresponding to the detected music data and determine the substitute music data on the basis of the analysis result.

Specifically, the control unit 180 may perform video recognition on a part of the video stream to recognize one or more objects and may determine the substitute music data on the basis of the characteristics of the recognized object. In this case, the characteristics of the objects may include at least one of the number of objects, object-specific labels, and movement speeds of the objects.

Also, the control unit 180 may analyze area-specific colors of the part and the degree of change in color to determine the substitute music data.

Further, after the filtering step S302 is performed, the control unit 180 may output a filtered audio stream (S303).

The data processing device 100 according to the present invention may output the video content including the filtered audio stream in the form of a file stored in the memory or directly output the video content on the display. Meanwhile, the data processing device 100 may transmit the filtered audio stream to an external server or external terminal.

For example, the data processing device 100 according to the present invention may be installed on a server of a video streaming platform. In this case, when a user uploads video content to the platform, the data processing device 100 may perform the filtering step S302 for the uploaded video content and then transmit the filtering result to a platform control device so that the filtering result is output on the platform.

As another example, the control unit 180 may delete the detected music data from the original audio stream and control the output unit 120 so that the video content including the changed audio stream is output. Also, the control unit 180 may output information related to a section of the original audio stream from which the music data has been deleted together with the changed video content.

For example, a changed video content file and a separate text file may be output. As another example, the control unit 180 may output the information related to the section from which the music data has been deleted using a log provided by a video platform and perform control so that the changed video content is output on the platform.

According to another embodiment, the control unit 180 may control the output unit 120 so that the original video content is parsed on the basis of the section in which the detected music data exists and output as a plurality of pieces of video content.

According to the present invention, even when a user does not directly scan video content, music data included in the video content can be detected, and thus it is possible to improve convenience of a user who edits video content.

Also, since music data can be detected from a huge amount of video content within a short time, the cost of video editing can be dramatically reduced.

Further, according to the present invention, a data processing device deletes music data corresponding to a copyrighted work included in video content or replaces it with substitute music so that convenience of a video content owner or distributor can be improved.

INDUSTRIAL APPLICABILITY

According to the present invention, even when a user does not directly scan video content, music data included in the video content can be detected, and thus it is possible to improve convenience of a user who edits video content.

Also, since music data can be detected from a huge amount of video content within a short time, the cost of video editing can be dramatically reduced.

Further, according to the present invention, a data processing device deletes music data corresponding to a copyrighted work included in video content or replaces it with substitute music so that convenience of a video content owner or distributor can be improved.

The invention claimed is:
1. A data processing method comprising:
   receiving video content including a video stream and an audio stream;
   detecting music data from the audio stream; and
   filtering the audio stream to remove the music data detected from the audio stream,
   wherein the detecting of the music data from the audio stream comprises a division operation of dividing the audio stream into music data and voice data and a detection operation of detecting a section in which the music data exists from the audio stream,
   wherein the division operation is performed by a first artificial intelligence (AI) model which is trained in advance,
   wherein the first AI model, which is composed of an artificial neural network that performs deep learning or machine learning, is configured to perform learning using training data labeled as music or voice,
   wherein the first AI model is configured to output a probability that each preset unit section of the audio stream corresponds to the music data and a probability that each preset unit section of the audio stream corresponds to the voice data,
   wherein the detection operation is performed by a second artificial intelligence (AI) model which is trained in advance, and
   wherein the second AI model is configured to perform learning using training data identified in advance as including music or not.
2. The data processing method of claim 1, wherein the filtering of the audio stream comprises:

determining whether the detected music data is a copyrighted work on the basis of copyright information of the detected music data; and filtering the audio stream in accordance with whether the detected music data is a copyrighted work.

3. The data processing method of claim 1, further comprising changing the detected music data with substitute music data which is different from the music data in the audio stream.

* * * * *